United States Patent
Oertli et al.

(10) Patent No.: US 11,773,294 B2
(45) Date of Patent: Oct. 3, 2023

(54) METHOD FOR ADHESIVELY BONDING RUBBER-BASED THERMOPLASTIC SUBSTRATES

(71) Applicant: SIKA TECHNOLOGY AG, Baar (CH)

(72) Inventors: Marcel Oertli, Winthertur (CH); Robert Roskamp, Altdorf (CH); Helena Wallimann, Alpnach (CH); Christoph Fäh, Zurich (CH); Fabien Choffat, Rüttenen (CH)

(73) Assignee: SIKA TECHNOLOGY AG, Baar (CH)

( * ) Notice: Subject to any disclaimer, the term of this patent is extended or adjusted under 35 U.S.C. 154(b) by 272 days.

(21) Appl. No.: 17/422,487

(22) PCT Filed: Mar. 19, 2020

(86) PCT No.: PCT/EP2020/057707
§ 371 (c)(1),
(2) Date: Jul. 13, 2021

(87) PCT Pub. No.: WO2020/188066
PCT Pub. Date: Sep. 24, 2020

(65) Prior Publication Data
US 2022/0073688 A1 Mar. 10, 2022

(30) Foreign Application Priority Data
Mar. 20, 2019 (EP) .................... 19164125

(51) Int. Cl.
| | | |
|---|---|---|
| *C09J 5/00* | (2006.01) | |
| *B32B 7/12* | (2006.01) | |
| *B32B 25/04* | (2006.01) | |
| *B32B 37/12* | (2006.01) | |
| *C08J 5/12* | (2006.01) | |
| *C09J 11/06* | (2006.01) | |
| *C09J 11/08* | (2006.01) | |
| *B32B 38/00* | (2006.01) | |

(52) U.S. Cl.
CPC ............... *C09J 5/00* (2013.01); *B32B 7/12* (2013.01); *B32B 25/042* (2013.01); *B32B 37/12* (2013.01); *C08J 5/124* (2013.01); *C09J 11/06* (2013.01); *C09J 11/08* (2013.01); *B32B 2037/1261* (2013.01); *B32B 2038/0056* (2013.01); *B32B 2250/02* (2013.01); *B32B 2250/248* (2013.01); *C08J 2323/16* (2013.01); *C08J 2375/08* (2013.01); *C08J 2400/26* (2013.01); *C09J 2301/41* (2020.08); *C09J 2415/006* (2013.01); *C09J 2421/006* (2013.01); *C09J 2423/006* (2013.01); *C09J 2471/00* (2013.01); *C09J 2475/00* (2013.01)

(58) Field of Classification Search
CPC ..... C09J 5/00; C09J 11/06; C09J 11/08; C09J 2415/006; C09J 2421/006; C09J 2423/006; C09J 2471/00; C09J 2475/00; B32B 7/12; B32B 25/042; B32B 37/12; B32B 2037/1261; B32B 2038/0056; B32B 2250/248; B32B 2270/00; C08J 5/124; C08J 2323/16; C08J 2375/08; C08J 2400/26
See application file for complete search history.

(56) References Cited

U.S. PATENT DOCUMENTS

| | | |
|---|---|---|
| 5,364,955 A | 11/1994 | Zwiener et al. |
| 2013/0245194 A1 | 9/2013 | Huang et al. |
| 2014/0037882 A1 | 2/2014 | Georgeau et al. |
| 2014/0261965 A1* | 9/2014 | Tang ............... B32B 37/12 525/105 |
| 2017/0368810 A1* | 12/2017 | Zacarias ............ B32B 5/022 |
| 2021/0269685 A1* | 9/2021 | Verosky ............ C08K 3/22 |

FOREIGN PATENT DOCUMENTS

| | | |
|---|---|---|
| EP | 1 544 254 A1 | 6/2005 |
| JP | 2012-246665 A | 12/2012 |
| WO | 2014/079613 A1 | 5/2014 |
| WO | 2019/057670 A1 | 3/2019 |

OTHER PUBLICATIONS

Jun. 17, 2020 International Search Report issued in International Patent Application No. PCT/EP2020/057707.
Jun. 17, 2020 Written Opinion issued in International Patent Application No. PCT/EP2020/057707.

* cited by examiner

*Primary Examiner* — Cynthia L Schaller
(74) *Attorney, Agent, or Firm* — Oliff PLC

(57) ABSTRACT

A method for adhesively bonding two substrates by means of a moisture-curable adhesive composition, wherein at least one of the substrates includes at least 40 wt.-% of a mixture, said mixture consisting of: between 15 and 99 wt.-% of at least one thermoplastic polymer; between 1 and 85 wt.-% of at least one elastomer; and wherein the moisture-curable adhesive composition includes: at least one polymer containing silane groups; between 10 and 40 wt.-% of at least one polymeric plasticizer; between 0.1 and 5 wt.-% of at least one amino-functional alkoxysilane; between 0 and 5 wt.-% of at least one C1-C12-alkyl-functional alkoxysilane. The method yields adhesively bonded substrates without the requirements of using migrating plasticizers and pre-treating of the substrates.

15 Claims, No Drawings

METHOD FOR ADHESIVELY BONDING RUBBER-BASED THERMOPLASTIC SUBSTRATES

TECHNICAL FIELD

The invention relates to a method for adhesively bonding two substrates, the use of an adhesive composition to adhesively bond two substrates, a kit-of-parts comprising said adhesive and two substrates, and adhesively bonded substrates.

BACKGROUND OF THE INVENTION

Membranes and sheets made of thermoplastic materials play an important role in the current building and construction industry. Waterproofing membranes, for example, are used in the construction industry to seal bases, underground surfaces such as tunnels, or roofing structures against water penetration. Furthermore, such membranes are commonly used for window and facade insulation.

State-of-the art waterproofing membranes or window and facade insulation membranes are, for example, multilayer systems comprising a polymer-based barrier layer to provide water tightness. Typical polymers used in the barrier layer include thermoplastics such as plasticized polyvinylchloride (p-PVC), thermoplastic elastomers (TPE), and elastomers such as ethylene-propylene diene monomer (EPDM). Thermoplastic elastomer is a group of materials, which have both thermoplastic and elastic properties.

Membranes composed of thermoplastic olefins (TPO) and other thermoplastic elastomers (TPE) are normally heat-weldable and less expensive than EPDM-membranes but they are also more rigid which decreases their suitability for roofing applications. Membranes based on plasticized PVC are more flexible than TPO-based membranes but they also contain environmentally harmful plasticizers and heavy metal additives such as flame retardants that may restrict their use in some applications.

One significant limitation of these thermoplastic membranes, or any objects made of thermoplastic polyolefin-based polymers, is the high difficulty to bond them adhesively, i.e. by using an adhesive. PVC-based substrates are somewhat an exception, since they can usually be bonded by current adhesive technology. However, especially in non-brittle membrane shape, PVC substrates need to be highly plasticized in order to exhibit the required softness and elasticity for application in roof, window or facade insulation. Such plasticizers tend to cause problems, including negative environmental impact or plasticizer-substrate migration effects, alongside with a steady deterioration of the membrane properties when the plasticizers migrate out or decompose. Furthermore, plasticizers may also be detrimental to adhesion properties since they may migrate into adhesives or form a surface layer that prevents the build-up of proper adhesive force between the PVC surface and the adhesive.

Non-halogenated polyolefin-based materials (such as TPO or EPDM) often do not require plasticization at all and overcome these problems. However, due to their low energy surface structure, they are notoriously difficult to bond by adhesives in general. They may be bonded with each other by heat welding or by using mechanical methods, but whenever they should be adhered directly to another substrate, such as concrete or wood, significant difficulties arise regarding the performance of commonly available adhesives. Additionally, in case of mechanical attachment, the sealing effect, e.g. against water, is often unsatisfactory.

Adhesion of reactive adhesives to polyolefin membranes (or otherwise shaped objects) is therefore a challenge and often requires vigorous pre-treatment of the membrane by chemical modification, either by using a reactive primer or with a flame ("flaming"), oxofluorination, plasma, corona, or similar techniques. The use of primers including highly reactive compounds that enable adhesion by chemical modification of the polyolefin surface is often not feasible in large area applications such as roof insulation. In all these cases, the surface modification is a cumbersome additional step for bonding of a polyolefin-based membrane or otherwise shaped object by adhesives.

There is thus still a need for a method to adhesively bond two substrates, at least one of which being a thermoplastic polymer and elastomer-containing substrate, preferably a polyolefin-based substrate, without the need for a pre-treatment step as described above. Furthermore, it would be desirable to employ such a method using a low VOC adhesive of low toxicity and in particular without having to rely on migrating plasticizers, neither in the thermoplastic substrate, nor in the adhesive.

SUMMARY OF THE INVENTION

The object of the present invention is to provide a method for adhesively bonding two substrates, wherein at least one of those substrates is based on a thermoplastic polymer containing an elastomer, by means of an environmentally friendly adhesive composition that does not require a chemical pre-treatment step for the thermoplastic polymer and elastomer-containing substrate.

It is furthermore an object of the present invention to provide such a method that can be done using a thermoplastic polymer and elastomer-containing substrate and an adhesive which both can be formulated free of migrating plasticizers.

It was surprisingly found that by using a moisture-curable adhesive composition comprising a silane-functional polymer, an amino-functional silane, an alkyl-functional silane, and a polymeric plasticizer in connection with a substrate comprising a thermoplastic polymer and an elastomer, a method for adhesively bonding said substrate can be realized that does not require chemical pre-treatment of the substrate. Furthermore, the method can be performed with adhesives and substrates that do not contain migrating plasticizers. The subject of the present invention is a method as defined in claim 1.

One of the advantages of the method is that it can be done with inexpensive and environmentally friendly, but difficult-to-bond rubber-modified polyolefinic substrates without chemically modifying pre-treatment of those substrates.

A further advantage is the fact that both substrate and adhesive exhibit low toxicity and low VOC and can be formulated free of migrating plasticizers.

Furthermore, unlike heat-welding, the method allows for adhesively bonding such thermoplastic polymer and elastomer-containing substrates to other common substrates in the building industry, such as concrete, wood, glass, and others, with the possibility of large area adhesion and without the need for special pre-treatment of those substrates as well.

Other aspects of the present invention are presented in other independent claims. Preferred aspects of the invention are presented in the dependent claims.

DETAILED DESCRIPTION OF THE INVENTION

The subject of the present invention is a method for adhesively bonding two substrates S, comprising the steps:
a) applying a moisture-curable adhesive composition A onto at least one of the two substrates S;
b) joining the two substrates S together such that the applied moisture-curable adhesive composition A forms an interlayer between the two substrates S such that the substrates S are directly connected by said interlayer; and
c) curing the moisture-curable adhesive composition A by means of moisture; characterized in that
at least one of the substrates S is a substrate S1, said substrate S1 comprising at least 40 wt.-%, based on the total weight of substrate S1, of a mixture E, said mixture E consisting of:
between 15 and 99 wt.-% of at least one thermoplastic polymer E1,
between 1 and 85 wt.-% of at least one elastomer E2, said proportions being based on the total weight of mixture E;
and wherein
the moisture-curable adhesive composition A comprises:
at least one polymer P containing silane groups,
between 10 and 40 wt.-%, based on the total composition, of at least one polymeric plasticizer PL,
between 0.1 and 5 wt.-%, based on the total composition, of at least one monomeric or oligomeric amino-functional alkoxysilane AS1,
between 0.1 and 5 wt.-%, based on the total composition, of at least one monomeric or oligomeric C3-C20-alkyl-functional alkoxysilane AS2.

In the present document, the term "silane group" refers to a silyl group which is bonded to an organic radical or to an organosiloxane radical and has one to three, especially two or three, hydrolyzable substituents on the silicon atom. Particularly useful hydrolyzable substituents are alkoxy radicals. These silane groups are also referred to as "alkoxysilane groups". Silane groups may also be in partly or fully hydrolyzed form, for example as silanols.

"Hydroxysilane", "isocyanatosilane", "aminosilane" and "mercaptosilane" refer respectively to organoalkoxysilanes having one or more hydroxyl, isocyanato, amino or mercapto groups on the organic radical in addition to the silane group. "Aminofunctional compound" refers to a compound which contains an amino group.

"Primary amino group" and "primary amine nitrogen" refer respectively to an $NH_2$ group and the nitrogen atom thereof that is bonded to an organic radical, and "secondary amino group" and "secondary amine nitrogen" refer respectively to an NH group and the nitrogen atom thereof that is bonded to two organic radicals which may also together be part of a ring, and "tertiary amino group" and "tertiary amine nitrogen" refer respectively to an N group and to the nitrogen atom thereof that is bonded to three organic radicals, two or three of which together may also be part of one or more rings. Accordingly, "primary aminosilanes" are aminosilanes comprising a primary amino group and "secondary aminosilanes" are aminosilanes comprising a secondary amino group. The latter also encompasses compounds having both a primary and a secondary amino group.

"Polyoxyalkylene radical" refers to a linear hydrocarbyl radical which contains ether groups and contains more than two repeat units of the (O—R) type in succession, where R is an alkylene radical, as for example from the polyaddition of ethylene oxide or 1,2-propylene oxide onto starter molecules having two active hydrogen atoms.

Substance names beginning with "poly", such as polyol, polyether, or polyisocyanate, refer to substances containing, in a formal sense, two or more of the functional groups that occur in their name per molecule.

The term "organic polymer" encompasses a collective of macromolecules that are chemically homogeneous but differ in relation to degree of polymerization, molar mass and chain length, which has been prepared by a poly reaction (polymerization, polyaddition, polycondensation) and has a majority of carbon atoms in the polymer backbone, and reaction products of such a collective of macromolecules. Polymers having a polyorganosiloxane backbone (commonly referred to as "silicones") are not organic polymers in the context of the present document.

The term "polyether containing silane groups" also encompasses organic polymers which contain silane groups and which, in addition to polyether units, may also contain urethane groups, urea groups or thiourethane groups. Such polyethers containing silane groups may also be referred to as "polyurethanes containing silane groups".

"Molecular weight" is understood in the present document to mean the molar mass (in grams per mole) of a molecule or part of a molecule, also referred to as "radical". "Average molecular weight" is understood to mean the number-average $M_n$ of an oligomeric or polymeric mixture of molecules or radicals, which is typically determined by means of gel permeation chromatography (GPC) against polystyrene as standard.

"Storage-stable" or "storable" refers to a substance or composition when it can be stored at room temperature in a suitable container over a prolonged period, typically at least 3 months up to 6 months or more, without any change in its application or use properties, especially in the viscosity and crosslinking rate, to a degree of relevance for the use thereof as a result of the storage.

"Room temperature" refers to a temperature of about 23° C.

A dotted line in the formulae in this document in each case represents the bond between a substituent and the corresponding molecular radical.

Nitrogen content of an aminofunctional alkoxysilane can be measured by the Kjeldahl method or the Dumas method, both which are known to the skilled person in the field of analytical chemistry.

The term "thermoplastic polymer" refers to a polymeric material that has thermoplastic properties, meaning that it softens and eventually melts upon heating and solidifies upon cooling and in solid form having an amorphous or semi-crystalline structure. Thermoplastic polymers can be melted and re-solidified with little or no change in physical properties.

The term "thermoplastic elastomer" (TPE) refers to a polymeric material that has elastomer-like properties in terms of mechanical behavior and the thermoplastic processability of a thermoplastic polymer. The term "thermoplastic elastomer" thus refers to a polymer or a polymer blend, which above its melting point (Tm) exhibits a thermoplastic character that enables it to be shaped into a fabricated article and which exhibits elastomeric behavior over a specified "design temperature range". The term "thermoplastic olefin" (TPO) refers to a thermoplastic elastomer (TPE) composed solely of olefin monomeric units. Also used herein, the term "thermoplastic olefin" may be used interchangeably with the terms "thermoplastic polyolefin", and "olefinic thermoplastic elastomer" (TPE-O).

The term "elastomer" refers to any natural, synthetic, or modified high molecular weight polymer or combination of polymers, which is capable of recovering from large deformations, and which can be, or already is, modified to a state in which it is not fusible or meltable and essentially insoluble (but can swell) in a boiling solvent. As used herein, the term "elastomer" may be used interchangeably with the term "rubber." Typical elastomers are capable of being elongated or deformed to at least 200% of their original dimension under an externally applied force, and will substantially resume the original dimensions, sustaining only small permanent set (typically no more than about 20%), after the external force is released. The term "glass transition temperature" refers to the temperature measured by differential scanning calorimetry (DSC) method according to ISO 11357 standard above which temperature a polymer component becomes soft and pliable, and below which it becomes hard and glassy. The measurements can be performed with a Mettler Toledo 822e device using a heating rate of 2 degrees centigrade/min. The $T_g$ values can be determined from the measured DSC-curve with the help of the DSC software.

The term "crosslinked" designates a polymer matrix, in which the polymer chains are inter-connected by a plurality of covalent bonds that are stable mechanically and thermally. Other possible forms of crosslinked polymers such as physically crosslinked polymers are not regarded as "crosslinked" in the context of the present disclosure. The terms "cured" and "vulcanized" may be used interchangeably with the term "crosslinked".

The term "crosslinking degree" refers to a proportion of the component, which is insoluble in boiling xylene. The percentage of insoluble proportion can be determined by refluxing a test specimen in boiling xylene, weighting the dried residue and making suitable corrections for other soluble and insoluble components present in the tested composition. Preferably, the crosslinking degree is measured by using a method as defined ISO 10147 standard.

The term "continuous" when used to describe process or process step refers to any process in which reagents and reacted products are supplied and removed continuously while a steady state or a stable reaction conditions are achieved.

The "amount or content of at least one component X" in a composition, for example "the amount of the at least one thermoplastic polymer" refers to the sum of the individual amounts of all thermoplastic polymers contained in the composition. For example, in case the composition comprises 20 wt.-% of at least one thermoplastic polymer, the sum of the amounts of all thermoplastic polymers contained in the composition equals 20 wt.-%.

A "melt blend" is obtained by melt processing of the blend components. The term "melt processing" refers in the present document to a process, in which at least one molten polymeric component is intimately mixed with at least one other component, which may be another molten polymeric component or a solid component, such as catalyst. The term "melt processing" can be used interchangeably with the terms "melt-mixing" and "melt-blending".

The method according to the present invention is a method for adhesively bonding two substrates S using a moisture curable adhesive composition A.

Substrates S

At least one of the substrates S is a substrate S1, said substrate S1 comprising at least 40 wt.-%, based on the total weight of substrate S1, of a mixture E, said mixture E consisting of:

between 15 and 99 wt.-% of at least one thermoplastic polymer E1, between 1 and 85 wt.-% of at least one elastomer E2, said proportions being based on the total weight of mixture E.

Substrate S1 thus comprises at least 40 wt.-% of a mixture E. Mixture E is a mixture of between 15 and 99 wt.-% of at least one thermoplastic polymer E1 and between 1 and 85 wt.-% of at least one elastomer E2.

The amounts of the at least one thermoplastic polymer E1 and the at least one elastomer E2 contained in mixture E are not particularly restricted.

It may be preferable that the at least one thermoplastic polymer E1 is present in mixture E in an amount of at least 25 wt.-%, more preferably at least 50 wt.-%, most preferably at least 65 wt.-%, based on the total weight of mixture E. High proportion of the elastomer E2 may be preferred particularly in applications where substrate S1 requires high elasticity. Increasing the proportion of the elastomer E2 in the mixture E may however result in increased tackiness of the mixture E and/or substrate S1, in particular if the elastomer E2 is not crosslinked or has a low crosslinking degree. Shaped articles produced using compositions having increased tackiness also exhibit increased blocking, which complicates various post-processing steps of the shaped articles such as cutting, welding, stacking, and unwinding from a roll. It may, therefore, be preferable that at least one elastomer E2 is present in mixture E in an amount of not more than 75 wt.-%, more preferably not more than 50 wt.-%, even more preferably not more than 40 wt.-%, most preferably not more than 35 wt.-%, based on the total weight of mixture E.

According to one or more embodiments, mixture E consists of:
a) 25-99 wt.-%, preferably 35-98 wt.-%, more preferably 45-97 wt.-%, even more preferably 55-96 wt.-%, most preferably 65-95 wt.-% of the at least one thermoplastic polymer E1 and
b) 1-75 wt.-%, preferably 2-65 wt.-%, more preferably 3-55 wt.-%, even more preferably 4-45 wt.-%, most preferably 5-35 wt.-% of the at least one elastomer E2, said proportions being based on the total weight of mixture E.

According to one or more embodiments, the at least one thermoplastic polymer E1 and the at least one elastomer E2 are present in mixture E and/or substrate S1 as a co-continuous phases. The expression "co-continuous" is understood to mean that the distinction between disperse and continuous polymer phases in the composition becomes difficult, as each phase becomes continuous in space. There may also be regions where the first phase appears to be dispersed within the second, and vice versa. Furthermore, each polymer is in the form of a continuous structure, wherein the structures of each polymer are intertwined with one another to form a co-continuous macrostructure. In these embodiments, it may be preferable that the at least one elastomer E2 contained in mixture E has a low crosslinking degree, in particular a crosslinking degree measured by using the method as defined in ISO 10147 standard of not more than 10.0 wt.-%, more preferably not more than 5.0 wt.-%, even more preferably not more than 2.5 wt.-%, most preferably not more than 1.5 wt.-%. Furthermore, it may be preferable that the at least one elastomer E2 contained in mixture E is non-crosslinked elastomer.

According to one or more further embodiments, the at least one elastomer E2 is present in mixture E as a particle-based phase, which is dispersed in a continuous phase of the at least one thermoplastic polymer E1. In these embodiments it may be preferable that the at least one elastomer E2 contained in the composition has a high crosslinking degree, in particular a crosslinking degree measured by using the method as defined in ISO 10147 standard of at least 25 wt.-%, more preferably at least than 50 wt.-%, even more preferably at least 75 wt.-%, most preferably at least 90 wt.-%. Compositions containing particles of a crosslinked elastomer component dispersed in a continuous phase of a thermoplastic component are typically produced by a dynamic vulcanization process. Such compositions are also known as thermoplastic vulcanizates (TPV). The term "dynamic vulcanization process" refers in the present document to a process in which a rubber component is selectively vulcanized during melt-mixing of a blend comprising a technologically compatible rubber and plastic component while minimally affecting the plastic component.

Preferably, the at least one thermoplastic polymer E1 and the at least one elastomer E2 are compatible. By the polymers components being "compatible" is understood to mean that the properties of a blend composed of the at least one thermoplastic polymer E1 and the at least one elastomer E2 are not inferior to those of the individual polymer components. It may be preferable that the at least one thermoplastic polymer E1 and the at least one elastomer E2 are partially miscible but not necessarily entirely miscible with each other. By the polymer components being "miscible" is understood to mean that a polymer blend composed of the at least one thermoplastic polymer E1 and the at least one elastomer E2 has a negative Gibbs free energy and heat of mixing. Polymer blends composed of entirely miscible polymer components tend to have one single glass transition point, which can be measured using dynamic mechanical thermal analysis (DMTA). The glass transition point can be determined, for example, as the peak of the measured tan delta curve (ratio of storage and loss moduli).

The type of the at least one thermoplastic polymer E1 is not particularly restricted. In principle all thermoplastic polymers may be used as thermoplastic polymer E1. Preferred thermoplastic polymers E1 include polyolefins, such as polyethylene (PE), in particular low density polyethylene (LDPE), high density polyethylene (HDPE), and linear low density polyethylene (LLDPE), polypropylene (PP), and polyvinyl chloride (PVC).

According to one or more embodiments, the at least one thermoplastic polymer E1 is a thermoplastic elastomer (TPE).

Thermoplastic elastomers (TPE) is a group of polymeric materials, which exhibit rubber elasticity over a specified temperature range but which at elevated temperatures can be processed as a thermoplastic. They include a class of copolymers and blends of thermoplastic and elastomer polymer components. A typical thermoplastic elastomer is a blend of a thermoplastic polymer and an elastomer component. The components of the thermoplastic elastomer can be formed as a reactor blend, in which case the thermoplastic polymer and the elastomer are simultaneously produced in a single reactor vessel using different catalysts, or as a physical blend, wherein the components are separately produced and subsequently melt-blended using high-shear mixing technique. Thermoplastic elastomers can also be provided as a single polymer component material composed of semi-crystalline random or block copolymers containing phase separated hard (crystalline) and soft (amorphous) segments.

Commercially available thermoplastic elastomers include, for example, thermoplastic polyolefins (TPO), styrenic block copolymers (TPS), thermoplastic vulcanizates (TPV), thermoplastic polyurethanes (TPU), thermoplastic copolyesters (TPC), and thermoplastic polyamides (TPA).

Preferably, the at least one thermoplastic polymer E1 when being a thermoplastic elastomer is a thermoplastic polyolefin (TPO) or an ethylene vinyl acetate copolymer (EVA), in particular an EVA with less than 40% vinyl acetate monomers. Thermoplastic polyolefins are thermoplastic elastomers, which are based solely on olefinic components. These are also known as "thermoplastic olefins" or "olefinic thermoplastic elastomers" (TPE-O). Commercially available thermoplastic polyolefins include reactor blends, physical blends and single polymer component materials, in particular those composed of random and block copolymers of olefin monomers. A blend-type TPO typically comprises at least one polyolefin, such as polypropylene or polyethylene as the thermoplastic component and at least one olefin copolymer elastomer (OCE), such as ethylene propylene rubber (EPR) or ethylene propylene diene monomer (EPDM), as the elastomer component.

Reactor blend-type TPOs also include commercial products, which are characterized as heterophasic copolymers or heterophasic random copolymers and impact copolymers (ICP). Heterophasic random copolymers are typically reactor blends of propylene random copolymer and ethylene propylene rubber (EPR). Typical impact copolymers comprise a semicrystalline homopolymer matrix, such as polypropylene matrix, and an elastomer phase, such as ethylene or propylene copolymer phase, which is dispersed within the homopolymer matrix. The amount of the elastomer component in impact copolymers is usually significantly lower than the amount of the homopolymer matrix, such as not more than 30 wt.-%, in particular not more than 20 wt.-%. Impact copolymer type of products containing higher amounts of the elastomeric phase are typically characterized as soft "TPOs" or "reactor TPOs".

Suitable reactor blend-type TPOs to be used as the at least one thermoplastic polymer E1 are commercially available, for example, from Lyondell Basell, under the trade name of Hifax®, such as Hifax® CA 10A, Hifax® CA 12A, and Hifax® CA 212 A and under the trade names of Adflex® and Adsyl®. Further suitable reactor blend-type TPOs characterized as heterophasic random propylene copolymers are commercially available, for example, from Borealis Polymers under the trade name of Borsoft®, such as Borsoft® SD233CF.

Suitable single polymer component TPOs to be used as the at least one thermoplastic polymer E1 include random and block copolymers of olefinic monomers containing phase separated hard (crystalline) and soft (amorphous) segments. These types of TPOs include, for example, ethylene-α-olefin copolymers and propylene-α-olefin copolymers. Propylene-α-olefin copolymers are usually characterized as plastomers or elastomers" whereas the ethylene-α-olefin copolymers are typically referred to as polyolefin plastomers (POP) or polyolefin elastomers (POE). The basic difference between plastomers and polyolefin elastomers is that plastomers tend to have somewhat lower elastic properties than polyolefin elastomers.

Suitable polyolefin plastomers (POP) based on ethylene-α-olefin copolymers to be used as the at least one thermoplastic polymer E1 are commercially available, for example, from Dow Chemicals under the trade name of Affinity®, such as such as Affinity® EG 8100G, Affinity® EG 8200G, Affinity® SL 8110G, Affinity® KC 8852G, Affinity® VP 8770G, and Affinity® PF 1140G, and from Exxon Mobil under the trade name of Exact®, such as Exact® 3024, Exact® 3027, Exact® 3128, Exact® 3131, Exact® 4049, Exact® 4053, Exact® 5371, and Exact® 8203. Suitable polyolefin elastomers (POE) based on ethylene-α-olefin random copolymers to be used as the at least one thermoplastic polymer E1 are commercially available, for example, from Dow Chemicals under the trade name of Engage®, such as Engage® 7256, Engage® 7467, Engage® 7447, Engage® 8003, Engage® 8100, Engage® 8480, Engage® 8540, Engage® 8440, Engage® 8450, Engage® 8452, Engage® 8200, and Engage® 8414

Suitable olefin block copolymers (OBC) based on ethylene-α-olefin block copolymers to be used as the at least one thermoplastic polymer E1 are commercially available, for example, from Dow Chemicals under the trade name of Infuse®, Infuse® 9100, Infuse® 9107, Infuse® 9500, Infuse® 9507, and Infuse® 9530.

Suitable plastomers based on propylene-ethylene copolymers to be used as the at least one thermoplastic polymer E1 are commercially available, for example, from Dow Chemicals under the trade name of Versify®, such as Versify® 2200, Versify® 3000, Versify® 3200, and Versify® 4200.

Suitable elastomers based on propylene-ethylene copolymers to be used as the at least one thermoplastic polymer E1 are commercially available, for example, from Dow Chemicals under the trade name of Versify®, such as Versify® 2300, Versify® 340, and Versify® 4301, and from Exxon Mobil under the trade name of Vistamaxx®, such as Vistamaxx® 6102, Vistamaxx® 6202, and Vistamaxx® 3000.

The at least one thermoplastic polymer E1 is in some preferred embodiments a mixture of two or more thermoplastic polymers, in particular two or more thermoplastic polyolefins (TPO). Such a mixture allows for a more balanced range of mechanical properties and facilitates processing of substrate S1.

In preferred embodiments, the thermoplastic polymer E1 is selected from polyethylene, polypropylene, polyvinyl chloride, ethylene-α-olefin random copolymers, styrenic block copolymers, ethylene vinyl acetate copolymers, or mixture of these polymers.

The at least one elastomer E2 is preferably selected from the group consisting of butyl rubber, halogenated butyl rubber, ethylene-propylene diene rubber (EPDM), natural rubber, chloroprene rubber, synthetic 1,4-cis-polyisoprene, polybutadiene, ethylene-propylene rubber, styrene-butadiene copolymer, isoprene-butadiene copolymer, styrene-isoprene-butadiene rubber, methyl methacrylate-butadiene copolymer, methyl methacrylate-isoprene copolymer, acrylonitrile-isoprene copolymer, and acrylonitrile-butadiene copolymer.

Preferred elastomers include isobutylene-based homopolymers and copolymers. These polymers can be described as random copolymer of a $C_4$ to $C_7$ isomonoolefin derived unit, such as isobutylene derived unit, and at least one other polymerizable unit.

The at least one elastomer E2 is preferably selected from the group consisting of butyl rubber and halogenated butyl rubber, preferably halogenated butyl rubber. The term "butyl rubber" designates in the present document a polymer derived from a monomer mixture containing a major portion of a C4 to C7 monoolefin monomer, preferably an isoolefin monomer and a minor portion, such as not more than 30 wt.-%, of a C4 to C14 multiolefin monomer, preferably a conjugated diolefin.

The preferred C4 to C7 monoolefin monomer may be selected from the group consisting of isobutylene, 2-methyl-1-butene, 3-methyl-1-butene, 2-methyl-2-butene, 4-methyl-1-pentene, and mixtures thereof.

The preferred C4 to C14 multiolefin comprises a C4 to C10 conjugated diolefin. The preferred C4 to C10 conjugated diolefin may be selected from the group comprising isoprene, butadiene, 2,4-dimethylbutadiene, piperyline, 3-methyl-1,3-pentadiene, 2,4-hexadiene, 2-neopentyl-1,3-butadiene, 2-methyl-1,5-hexadiene, 2,5-dimethyl-2,4-hexadiene, 2-methyl-1,4-pentadiene, 2-methyl-1,6-heptadiene, cyclopentadiene, methylcyclopentadiene, cyclohexadiene, 1-vinyl-cyclohexadiene and mixtures thereof.

Preferred butyl rubbers are derived from a monomer mixture containing from about 80 wt.-% to about 99 wt.-% of a C4 to C7 monoolefin monomer and from about 1.0 wt.-% to about 20 wt.-% of a C4 to C14 multiolefin monomer. More preferably, the monomer mixture contains from about 85 wt.-% to about 99 wt.-% of a C4 to C7 monoolefin monomer and from about 1.0 wt.-% to about 10 wt.-% of a C4 to C14 multiolefin monomer. Most preferably, the monomer mixture contains from about 95 wt.-% to about 99 wt.-% of a C4 to C7 monoolefin monomer and from about 1.0 wt.-% to about 5.0 wt.-% of a C4 to C14 multiolefin monomer.

The most preferred butyl rubbers are derived from a monomer mixture comprising from about 97 wt.-% to about 99.5 wt.-% of isobutylene and from about 0.5 wt.-% to about 3 wt.-% of isoprene.

The term "halogenated rubber" refers in the present documents to a rubber having a halogen content of at least 0.1 mol.-percent, wherein the halogen is preferably selected from the group consisting of bromine, chlorine and iodine. Preferred halogenated butyl rubbers may have halogen content of not more than 10 wt.-%, more preferably not more than 7.5 wt.-%, most preferably not more than 5.0 wt.-%, based on the total weight of the butyl rubber.

According to one or more embodiment, the at least one elastomer E2 is a halogenated butyl rubber, preferably a bromobutyl rubber or a chlorobutyl rubber, having a halogen content in the range of 0.1-10 wt.-%, preferably 0.5-7.5 wt.-%, more preferably 0.5-5.0 wt.-%, based on the total weight of the butyl rubber. According to one or more further embodiments, the at least one elastomer is a halogenated butyl rubber, preferably a bromobutyl rubber or a chlorobutyl rubber, having a halogen content in the range of 0.1-5.0 wt.-%, preferably 0.1-3.5 wt.-%, more preferably 0.1-2.5 wt.-%, most preferably 0.1-1.5 wt.-%.

In preferred embodiments of the method according to the present invention, the at least one elastomer E2 is selected from the group consisting of butyl rubber and halogenated butyl rubber and/or the at least one thermoplastic polymer E1 is at least one thermoplastic polyolefin elastomer (TPE-O).

Substrate S1 may further comprise auxiliary components, for example, UV- and heat stabilizers, UV-absorbers, antioxidants, plasticizers, flame retardants, fillers, dyes, pigments such as titanium dioxide and carbon black, matting agents, antistatic agents, impact modifiers, biocides, and processing aids such as lubricants, slip agents, antiblock agents, and denest aids. The total amount of the auxiliary components is preferably not more than 55 wt.-%, more preferably not more than 50 wt.-%, most preferably not more than 45 wt.-%, based on the total weight of substrate S1.

Substrate S1 as defined above is preferably obtained by a process comprising melt-processing a starting blend comprising mixture E consisting of the at least one thermoplastic polymer E1 and the at least one elastomer E2. The term "melt processing" refers in the present disclosure to a process, in which at least one molten polymeric component is intimately mixed with at least one other component, which may be another molten polymeric component or a solid component, such as a filler or a catalyst. The melt-processed starting blend may be used as such or further processed to a shaped article by using any conventional technique known to a skilled person, for example, extrusion, molding, or calendaring technique. Preferably, substrate S1 is obtained by melt-processing a starting blend comprising mixture E consisting of the at least one thermoplastic polymer E1 and the at least one elastomer E2 and extruding the melt-processed starting blend through an extruder die.

The melt-processing is preferably conducted at a temperature, which is above the melting point of the at least one thermoplastic polymer E1, or in case the starting blend comprises more than one thermoplastic polymer E1, at a temperature, which is above the melting point of the thermoplastic polymer E1 having the highest melting point. The melt processing can be conducted as a batch process using any conventional mixer, such as a Brabender, Banbury, or roll mixer or as continuous process using a continuous type mixer, preferably an extruder, such as a single screw or a twin screw extruder.

It may be preferable that the starting blend comprises, in addition to the at least one thermoplastic polymer E1 and the at least one elastomer E2, at least one catalyst. The at least one catalyst may be present in the starting blend to catalyze chain extension and/or crosslinking and/or coupling reactions of the polymer components, in particular of the at least one elastomer E2, during and/or after the melt-processing step.

The at least one catalyst is preferably selected from the group consisting of metal oxides, metal salts of fatty acids and metal salts of boric acid, sulfur, phenol resin catalysts, fatty acids, and mixtures thereof. Suitable metal oxide catalysts include, for example, ZnO, CaO, MgO, $Al_2O_3$, $CrO_3$, FeO, $Fe_2O_3$, NiO, and mixtures thereof. Suitable sulfur catalysts include powdered sulfur, precipitated sulfur, high dispersion sulfur, surface-treated sulfur, insoluble sulfur, dimorpholinedisulfide, alkylphenoldisulfide, and mixtures thereof. Suitable phenol resin catalysts include bromide of an alkylphenol resin or mixed catalysts containing stannous chloride, chloroprene, or another halogen donor and an alkylphenol resin, and mixtures thereof.

The at least one catalyst, if used, is preferably present in the starting blend in an amount of not more than 10 wt.-%, more preferably not more than 7.5 wt.-%, most preferably not more than 5.0 wt.-%, based on the total weight of the starting blend. It may be preferable that the at least one catalyst is present in the starting blend in an amount of 0.1-7.5% wt.-%, more preferably 0.1-5.0 wt.-%, even more preferably 0.1-2.5 wt.-%, most preferably 0.25-2.0 wt.-%, based on the total weight of the starting blend. It is also possible that some portion of the at least one catalyst is not consumed in the reactions of the polymer components during the melt-processing and shaping steps. It may, therefore, be advantageous that the at least catalyst is also present in substrate S1. The amount of the at least one catalyst in substrate S1 is preferably significantly lower than in the starting blend. It may be preferable that substrate S1 comprises not more than 1.5 wt.-%, more preferably not more than 1.0 wt.-%, most preferably not more than 0.5 wt.-% based on the total weight of substrate S1, of at least one catalyst selected from the group consisting of metal oxides, sulfur, phenol resin catalysts, fatty acids, and mixtures thereof.

The at least one catalyst may also be used in combination with at least one accelerator selected from the group consisting of guanidine compounds, aldehyde amine compounds, aldehyde ammonium compounds, thiazole compounds, sulfonamide compounds, thiourea compounds, thiuram compounds, xanthane compounds, and dithiocarbamate compounds. Such accelerators may be present in the starting blend in a total amount of 0.1-5.0 phr (parts by weight per 100 parts by weight of the at least one elastomer E2).

According to one or more embodiments, the at least one catalyst is selected from the group consisting of ZnO, CaO, MgO, $Al_2O_3$, $CrO_3$, FeO, $Fe_2O_3$, NiO, and zinc salts of fatty acids having at least 6 carbon atoms, preferably at least 13 carbon atoms, and zinc borate. According to one or more further embodiments, the at least one catalyst is ZnO or a mixture of ZnO and another metal oxide selected from the group consisting of CaO, MgO, $Al_2O_3$, $CrO_3$, FeO, $Fe_2O_3$, and NiO, or zinc salts of a fatty acid having at least 6 carbon atoms, preferably at least 13 carbon atoms, or zinc borate.

The starting blend and substrate S1 may further comprise one or more metal salts of a fatty acid different from the at least one catalyst and/or one or more fatty acids. Preferably, the metal in the metal salt of a fatty acid is selected from the group consisting of Zn, Ca, Mg, Al, Cr, Fe, Fe, and Ni. Preferably, the fatty acid has at least 6 carbon atoms, more preferably at least 13 carbon atoms. Saturated fatty acids having at least 6 carbon atoms, in particular at least 13 carbon atoms have been found particularly suitable.

Substrate S1 comprising E1 and E2 may further comprise stabilizers, in particular UV stabilizers and preferably at least one hindered amine light stabilizer (HALS). These compounds are typically added to polymer blends as stabilizers against light-induced polymer degradation. The at least one hindered amine light stabilizer is preferably an alkoxyamine hindered amine light stabilizer (NOR-HALS). According to one or more embodiments, the starting blend further comprises 0.1-10.0% by weight, preferably 0.1-5.0% by weight, based on the total weight of blend, of at least one alkoxyamine hindered amine light stabilizer (NOR-HALS).

Substrate S1 comprising E1 and E2 may further comprise at least one flame retardant. These are needed, in particular, in case substrate S1 is used in roofing applications, for example, for providing a roofing membrane containing one or more layers composed of the composition of the present invention.

According to one or more embodiments, substrate S1 comprising E1 and E2 further comprises 1-50% by weight, preferably 5-40% by weight, based on the total weight substrate S1, of at least one flame retardant selected from the group consisting of magnesium hydroxide, aluminum trihydroxide, antimony trioxide, ammonium polyphosphate, and melamine-, melamine resin-, melamine derivative-, melamine-formaldehyde-, silane-, siloxane-, and polystyrene-coated ammonium polyphosphates.

Substrate S1 comprising E1 and E2 may further comprise fillers. Suitable fillers include, for example, inert mineral fillers, such as sand, granite, calcium carbonate, clay, expanded clay, diatomaceous earth, pumice, mica, kaolin, talc, dolomite, xonotlite, perlite, vermiculite, Wollastonite, barite, magnesium carbonate, calcium hydroxide, calcium aluminates, silica, fumed silica, fused silica, aerogels, glass beads, hollow glass spheres, ceramic spheres, bauxite, comminuted concrete, and zeolites.

Substrate S1 may be of any shape. Preferably, it is a membrane or sheet. Preferably, such a membrane or sheet has a layer thickness of at least 0.1 mm, preferably at least 1 mm, more preferably at least 5 mm.

In one or more embodiments of the present invention, both substrates S are substrates S1. In these embodiments, the method according to the present invention can be used instead of heat welding, for example in heat-sensitive applications.

In other embodiments, substrates S comprise a second substrate S2 that is adhesively bonded to the first substrate S1.

Substrate S2 may be any substrate commonly found in construction and building industry. The adhesive composition A according to the present invention is normally able to adhere properly after curing to virtually all such substrates without the need of chemically reactive pre-treatment.

Suitable substrates S2 are especially
- glass, glass ceramic, concrete, mortar, brick, tile, gypsum and natural rocks such as limestone, granite or marble;
- metals and alloys such as aluminum, iron, steel and nonferrous metals, and also surface-finished metals and alloys such as galvanized or chromed metals or surface coated metals, such as Kynar®- or Duranar®-coated aluminum;
- leather, textiles, paper, wood, woodbase materials bonded with resins, for example phenolic, melamine or epoxy resins, resin-textile composites and further polymer composites;
- plastics such as polyvinyl chloride (rigid and flexible PVC), acrylonitrile-butadiene-styrene copolymers (ABS), polycarbonate (PC), polyamide (PA), polyesters, poly(methyl methacrylate) (PMMA), epoxy resins, polyurethanes (PUR), polyoxymethylene (POM), ethylene/propylene/diene terpolymers (EPDM), and also fiber-reinforced plastics such as carbon fiber-reinforced plastics (CFP), glass fiber-reinforced plastics (GFP) and sheet molding compounds (SMC), where the plastics may have been surface-treated by means of plasma, corona or flames;
- coated substrates such as powder-coated metals or alloys;
- paints or varnishes, especially automotive topcoats;
- bituminous substrates such as bitumen, PE laminates with bituminous backside.

Substrate S2 is preferably selected from the list consisting of: glass, glass ceramic, concrete, mortar, brick, tile, gypsum, natural stone, metals and alloys, textiles, wood, wood-resin composites, resin-textile composites, resin-glass- or carbon-fiber composites, polyvinyl chloride (PVC), acrylonitrile-butadiene-styrene copolymers (ABS), polycarbonate (PC), polyamide (PA), polyesters, poly(methyl methacrylate) (PMMA), epoxy resins, paints, varnishes, coated substrates, and bitumen.

If required, the substrates S1 and/or S2 can be pretreated prior to the application of the composition, especially by chemical and/or physical cleaning methods, such as de-greasing or brushing, or by the application of an adhesion promoter, an adhesion promoter solution or a primer.

In general, it is not required to pre-treat the surfaces prior to application of the composition, in particular not by chemically reactive methods. The composition A shows an excellent adhesion profile on a large variety of unprimed, non-pretreated, and even uncleaned materials.

In the method according to the present invention, said substrate S1 preferably is not pre-treated by a chemically reactive primer, flame, oxofluorination, plasma, or corona pre-treatment prior to step a) of the method according to the present invention.

However, it may be advantageous to de-grease, clean, or brush either substrate S before applying the adhesive composition A. This is normally only required when the substrates are visibly dirty or layered with dust, but may be advantageous in any case, e.g. to remove process oils or other surface contaminants. It is recommended to use an alcohol or mild solvent to de-grease the surfaces after mechanical removal of any particulate matter possibly present. With some substrates S, mechanical roughening, e.g., by using a metal brush, may be advantageous, in particular when the surface is extremely smooth.

Moisture-Curable Adhesive Composition A

The moisture-curable adhesive composition A to be used in the method according to the present invention comprises:
- at least one polymer P containing silane groups,
- between 10 and 40 wt.-%, based on the total composition, of at least one polymeric plasticizer PL,
- between 0.1 and 5 wt.-%, based on the total composition, of at least one monomeric or oligomeric amino-functional alkoxysilane AS1,
- between 0 and 5 wt.-%, based on the total composition, of at least one monomeric or oligomeric C1-C12-alkyl-functional alkoxysilane AS2.

The moisture-curable adhesive composition A comprises between 0.1 and 5 wt.-%, based on the total composition, of at least one monomeric or oligomeric aminofunctional alkoxysilane AS1.

Preferably, composition A comprises between 0.2 and 2.5 wt.-%, based on the total composition, of the monomeric or oligomeric aminofunctional alkoxysilane AS1.

In preferred embodiments, the at least one monomeric or oligomeric aminofunctional alkoxysilane AS1 has a nitrogen content of between 4.5 and 14.5 wt.-%, preferably between 5 and 10 wt.-% based on the total weight of AS1.

In the same or other preferred embodiments containing an oligomeric aminofunctional aminofunctional alkoxysilane AS1, the at least one oligomeric aminofunctional alkoxysilane AS1 has a nitrogen content of between 15 and 20 wt.-%, based on the total weight of AS1. One advantage of the high nitrogen content, especially of the oligomeric aminofunctional alkoxysilane AS1, is a faster adhesion build-up after application of the adhesive composition.

Silane AS1 may be monomeric or oligomeric. The oligomeric forms of AS1 are linear, branched, or cyclic oligomers, formed by the partial hydrolysis and condensation of monomeric aminofunctional alkoxysilanes, and, in some embodiments, partially with other, not aminofunctional alkoxysilanes, such as alkyl alkoxysilanes or tetraalkoxysilanes.

One advantage of using oligomeric alkoxysilanes AS1 is that lower VOC levels can be achieved when employing them in greater amounts compared to purely monomeric silanes.

Monomeric aminofunctional alkoxysilanes that are suitable as silane AS1 or as precursor for the production of oligomeric silanes AS1 are shown in formula (I),

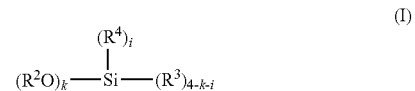

(I)

where
$R^2$ is a monovalent alkyl radical having 1 to 6 carbon atoms, preferably 1 or 2 carbon atoms, most preferably a methyl radical;
$R^3$ is a monovalent aminoalkyl radical selected from $-C_pH_{2p}-NH_2$, $-C_pH_{2p}-NH-R^5$, $-C_pH_{2p}-NH-C_dH_{2d}-NH_2$, $-C_pH_{2p}-NH-C_dH_{2d}-NH-C_eH_{2e}-$ $NH_2$, $-C_pH_{2p}-NH-C_dH_{2d}-NH-R^5$, and $-C_pH_{2p}-NH-C_dH_{2d}-NH-C_eH_{2e}-NH-R^5$;

$R^4$ is a monovalent linear, branched, or cyclic alkyl or arakyl radical having 1 to 12 carbon atoms, preferably 1 to 8 carbon atoms, most preferably a methyl radical;

$R^5$ is a monovalent linear, branched, or cyclic alkyl or arakyl radical having 1 to 12 carbon atoms, preferably 1 to 6 carbon atoms;

index i is an integer with a value of 0 or 1, preferably 0;
index k is an integer with a value of 2 or 3, with the provisio that if i=1 then k=2;
index p is an integer with a value of 1 to 6;
indices d and e are independently integers with a value of 2 to 6.

Suitable oligomeric silanes AS1 are shown in formula (II) and (III), where formula (II) shows linear oligomers and formula (III) shows cyclic oligomers. It is possible to also use branched oligomers, at least in portions of a mixture of oligomers.

Suitable linear oligomers for use as oligomeric silanes AS1 are shown in formula (II),

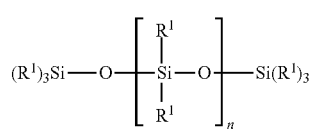

(II)

where
$R^1$ independently stands for
an alkoxy radical with 1 to 6 carbon atoms, preferably 1 or two carbon atoms, more preferably a methoxy radical
an $R^3$ as defined above, or
an $R^4$ as defined above; and
index n is an integer with a value of 1 to 30.

Suitable cyclic oligomers for use as oligomeric silanes AS1 are shown in formula (III),

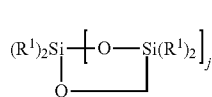

(III)

where
$R^1$ has the same meaning as above; and
Index j is an integer with a value of 3 to 30.

Preferred monomeric or oligomeric aminofunctional alkoxysilanes AS1 include N-(n-Butyl)-3-aminopropyltrimethoxysilane, 3-aminopropyltrimethoxysilane, 3-aminopropyldimethoxymethyl-silane, N-(2-aminoethyl)-3-aminopropyltrimethoxysilane, N-(2-aminoethyl)-3-aminopropyldimethoxymethylsilane, N-(2-aminoethyl)-N'-[3-(trimethoxysilyl)-propyl]ethylenediamine and oligomers obtained from the condensation of the mentioned aminosilanes, optionally oligomerized together with alkylalkoxysilanes, in particular methyltrimethoxysilane, ethyltrimethoxysilane, propyltrimethoxysilane, vinyltrimethoxysilane, n-butyltrimethoxysilane, isobutyltrimethoxysilane, phenyltrimethoxysilane, and octyltrimethoxysilane.

Also preferred are monomeric or oligomeric or the analogs thereof with ethoxy in place of methoxy groups.

Most preferred monomeric or oligomeric aminofunctional alkoxysilane AS1 include N-(n-Butyl)-3-aminopropyltrimethoxysilane and the oligomers obtained from the condensation of N-(n-Butyl)-3-aminopropyltrimethoxysilane with alkylalkoxysilanes as mentioned above. These silanes, when used in the compositions according to the present invention, have the advantage that the compositions have a particularly low modulus and high movement capabilities after curing, which makes them especially suitable as adhesive sealants.

Preferably, said monomeric or oligomeric aminofunctional alkoxysilane AS1 has a viscosity of between 2 and 40 mPa·s, measured at 20° C. according to DIN 53015. This viscosity range enables particularly good adhesion properties.

Many suitable oligomeric aminofunctional alkoxysilanes AS1 and the synthetic route to obtain them can be found in WO 2014/079613.

Most preferred oligomeric aminofunctional alkoxysilane AS1 is the oligomer obtained from the condensation of N-(n-Butyl)-3-aminopropyltrimethoxysilane.

Preferably, said oligomeric aminofunctional alkoxysilane AS1 has a viscosity of between 1500 and 3500 mPa·s, measured at 20° C. according to DIN 53015. This viscosity range enables a particularly good miscibility with polymer P and particularly good adhesion properties.

In preferred embodiments, said monomeric or oligomeric aminofunctional alkoxysilane AS1 comprises secondary amino groups. These embodiments have the advantage that the compositions have a particularly low modulus and high movement capabilities after curing, which makes them especially suitable as elastic adhesive in the method according to the present invention.

Furthermore, composition A preferably comprises between 0.1 and 5 wt.-%, preferably between 1 and 4 wt.-%, in particular between 2 and 3 wt.-%, based on the total composition A, of at least one monomeric or oligomeric C3-C20-alkyl-functional alkoxysilane AS2.

Monomeric C3-C20-alkyl-functional alkoxysilanes that are suitable as silane AS2 or as precursor for the production of oligomeric silanes AS2 are defined in formula (Ib),

(Ib)

where
$R^2$ is a monovalent alkyl radical having 1 to 6 carbon atoms, preferably 1 or 2 carbon atoms, most preferably a methyl radical;

$R^4$ is a monovalent linear, branched, or cyclic alkyl or arakyl radical having 3 to 20 carbon atoms, preferably 5 to 16 carbon atoms, more preferably 6 to 12 carbon atoms, most preferably an octyl or isooctyl radical;

index k is an integer with a value of 2 or 3, preferably 3.

Oligomeric forms of silane AS2 are represented by formula (II) and (III) further above, with the provisio that $R^1$ independently stands for
an alkoxy radical with 1 to 6 carbon atoms, preferably 1 or two carbon atoms, more preferably a methoxy radical; or
an $R^4$ as defined above for formula (Ib);
index n is an integer with a value of 1 to 30; and
index j is an integer with a value of 3 to 30.

In preferred embodiments, said C3-C20-alkyl-functional alkoxysilane AS2 is comprised in composition A with an amount of at least 0.5 wt.-%, based on the total composition A and/or said C3-C20-alkyl-functional alkoxysilane AS2 is a monomeric or oligomeric C6-C8-alkyl-functional alkoxysilane.

Furthermore required in the composition A according to the present invention is at least one polymer P containing silane groups.

The polymer P containing silane groups is in particular selected from organic polymers containing silane groups, as described more specifically hereinafter. An organic polymer containing silane groups has the advantage of having particularly good adhesion properties on a multitude of substrates and being particularly inexpensive.

In general, it is preferred that the amount of polymer P in the composition A is between 10 and 40 wt.-%, preferably between 12 and 35 wt.-%, in particular between 15 and 30 wt.-%, based on the total composition A. This range allows for good mechanical properties without making the composition too expensive.

Preferably, the polymer P containing silane groups is an organic polymer containing silane groups, especially a polyurethane, polyolefin, polyester, polycarbonate, polyamide, poly(meth)acrylate or polyether or a mixed form of these polymers, each of which bears one or preferably more than one silane group. The silane groups may be in pendant positions in the chain or in terminal positions and are bonded to the organic polymer via a carbon atom.

More preferably, the organic polymer containing silane groups is a polyolefin containing silane groups or a poly(meth)acrylate containing silane groups or a polyurethane containing silane groups or a polyether containing silane groups or a mixed form of these polymers.

Most preferably, the organic polymer containing silane groups is a polyether containing silane groups or a polyurethane containing silane groups or a poly(meth)acrylate containing silane groups or a mixture of these polymers.

The silane groups present in the organic polymer containing silane groups are preferably alkoxysilane groups, especially alkoxysilane groups of the formula (VI)

(VI)

where
$R^{14}$ is a linear or branched, monovalent hydrocarbyl radical having 1 to 5 carbon atoms, especially methyl or ethyl or isopropyl;
$R^{15}$ is a linear or branched, monovalent hydrocarbyl radical having 1 to 8 carbon atoms, especially methyl or ethyl; and
x is a value of 0 or 1 or 2, preferably 0 or 1, especially 0.

More preferably $R^{14}$ is methyl or ethyl.

For particular applications, the $R^{14}$ radical is preferably an ethyl group, since, in this case, ecologically and toxicologically harmless ethanol is released in the course of curing of the composition.

Particular preference is given to trimethoxysilane groups, dimethoxymethyl-silane groups or triethoxysilane groups.

In this context, methoxysilane groups have the advantage that they are particularly reactive, and ethoxysilane groups have the advantage that they are toxicologically advantageous and particularly storage-stable.

The organic polymer containing silane groups has an average of preferably 1.3 to 4, especially 1.5 to 3, more preferably 1.7 to 2.8, silane groups per molecule. The silane groups are preferably terminal.

The organic polymer containing silane groups preferably has an average molecular weight, determined by means of GPC against a polystyrene standard, in the range from 1,000 to 30,000 g/mol, especially from 2,000 to 20,000 g/mol. The organic polymer containing silane groups preferably has a silane equivalent weight of 300 to 25,000 g/eq, especially of 500 to 15,000 g/eq.

The organic polymer containing silane groups may be solid or liquid at room temperature. It is preferably liquid at room temperature.

Most preferably, the organic polymer containing silane groups is an organic polymer containing silane groups which is liquid at room temperature, where the silane groups are especially dialkoxysilane groups and/or trialkoxysilane groups, more preferably trimethoxysilane groups or triethoxysilane groups.

Processes for preparing organic polymers containing silane groups are known to the person skilled in the art.

In a preferred process, organic polymers containing silane groups are obtainable from the reaction of organic polymers containing allyl groups with hydrosilanes, optionally with chain extension using, for example, diisocyanates.

In a further preferred process, polyethers containing silane groups are obtainable from the copolymerization of alkylene oxides and epoxysilanes, optionally with chain extension using, for example, diisocyanates.

In a further preferred process, organic polymers containing silane groups are obtainable from the reaction of organic polyols with isocyanatosilanes, optionally with chain extension using diisocyanates.

In a further preferred process, polyethers containing silane groups are obtainable from the reaction of organic polymers containing isocyanate groups, especially NCO-terminated urethane polymers from the reaction of polyols with a superstoichiometric amount of polyisocyanates, with aminosilanes, hydroxysilanes or mercaptosilanes. Polyethers containing silane groups from this process are particularly preferred. This process enables the use of a multitude of inexpensive starting materials of good commercial availability, by means of which it is possible to obtain different polymer properties, for example high extensibility, high strength, low modulus of elasticity, low glass transition point or high weathering resistance.

More preferably, the organic polymer containing silane groups is obtainable from the reaction of NCO-terminated urethane polyethers with aminosilanes or hydroxysilanes. Suitable NCO-terminated urethane polymers are obtainable from the reaction of polyols, especially polyether polyols, in particular polyoxyalkylenediols or polyoxyalkylenetriols, preferably polyoxypropylenediols or polyoxypropylenetriols, with a superstoichiometric amount of polyisocyanates, especially diisocyanates. Also other polyols, such as poly(meth)acrylate polyols, polyhydrocarbon polyols, in particular polybutadiene polyols, polyhdroxy functional fats or oils, polycarbonate polyols, polyester polyols and polyhydroxy functional acrylonitrilie/butadiene copolymers are suitable. Furthermore, small amounts of low molecular weight dihydric or polyhydric alcohols, such as diols, glycols, and sugar alcohols may be used as additives.

Preferably, the reaction between the polyisocyanate and the polyol is conducted with exclusion of moisture at a temperature of 50° C. to 160° C., optionally in the presence of suitable catalysts, with metered addition of the polyisocyanate in such a way that the isocyanate groups thereof are present in a stoichiometric excess in relation to the hydroxyl groups of the polyol. More particularly, the excess of polyisocyanate is chosen such that a content of free isocyanate groups of 0.1% to 5% by weight, preferably 0.2% to 4% by weight, more preferably 0.3% to 3% by weight, based on the overall polymer, remains in the resulting urethane polymer after the reaction of all hydroxyl groups.

Preferred diisocyanates are selected from the group consisting of hexamethylene 1,6-diisocyanate (HDI), 1-isocyanato-3,3,5-trimethyl-5-isocyanatomethylcyclohexane (=isophorone diisocyanate or IPDI), tolylene 2,4- and 2,6-diisocyanate and any desired mixtures of these isomers (TDI) and diphenylmethane 4,4'-, 2,4'- and 2,2'-diisocyanate and any desired mixtures of these isomers (MDI). Particular preference is given to IPDI or TDI. Most preferred is IPDI. In this way, polyethers containing silane groups with particularly good lightfastness are obtained.

Especially suitable as polyether polyols are polyoxyalkylenediols or polyoxyalkylenetriols having a degree of unsaturation lower than 0.02 meq/g, especially lower than 0.01 meq/g, and a mean molecular weight in the range from 400 to 25'000 g/mol, especially 1000 to 20'000 g/mol.

As well as polyether polyols, it is also possible to use portions of other polyols, especially polyacrylate polyols, and low molecular weight diols or triols.

Suitable aminosilanes for the reaction with an NCO-terminated urethane polyether are primary and secondary aminosilanes. Preference is given to 3-aminopropyltrimethoxysilane, 3-aminopropyldimethoxymethylsilane, 4-aminobutyltrimethoxysilane, 4-amino-3-methylbutyltrimethoxysilane, 4-amino-3,3-dimethylbutyltrimethoxysilane, N-butyl-3-aminopropyltrimethoxysilane, N-phenyl-3-aminopropyltrimethoxysilane, adducts formed from primary amino-silanes such as 3-aminopropyltrimethoxysilane, 3-aminopropyldimethoxy-methylsilane or N-(2-aminoethyl)-3-aminopropyltrimethoxysilane and Michael acceptors such as acrylonitrile, (meth)acrylic esters, (meth)acrylamides, maleic or fumaric diesters, citraconic diesters or itaconic diesters, especially dimethyl or diethyl N-(3-trimethoxysilylpropyl)aminosuccinate. Likewise suitable are analogs of the aminosilanes mentioned with ethoxy or isopropoxy groups in place of the methoxy groups on the silicon.

Suitable hydroxysilanes for the reaction with an NCO-terminated urethane polyether are especially obtainable from the addition of aminosilanes onto lactones or onto cyclic carbonates or onto lactides.

Aminosilanes suitable for the purpose are especially 3-aminopropyltrimethoxysilane, 3-aminopropyltriethoxysilane, 4-aminobutyltrimethoxysilane, 4-aminobutyltriethoxysilane, 4-amino-3-methylbutyltrimethoxysilane, 4-amino-3-methylbutyltriethoxysilane, 4-amino-3,3-dimethylbutyltrimethoxysilane, 4-amino-3,3-dimethylbutyltriethoxysilane, 2-aminoethyltrimethoxysilane or 2-aminoethyltriethoxysilane. Particular preference is given to 3-aminopropyltrimethoxysilane, 3-aminopropyltriethoxysilane, 4-amino-3,3-dimethylbutyltrimethoxysilane or 4-amino-3,3-dimethylbutyltriethoxysilane.

Suitable lactones are especially γ-valerolactone, γ-octalactone, δ-decalactone, and ε-decalactone, especially γ-valerolactone.

Suitable cyclic carbonates are especially 4,5-dimethyl-1,3-dioxolan-2-one, 4,4-dimethyl-1,3-dioxolan-2-one, 4-ethyl-1,3-dioxolan-2-one, 4-methyl-1,3-dioxolan-2-one or 4-(phenoxymethyl)-1,3-dioxolan-2-one.

Suitable lactides are especially 1,4-dioxane-2,5-dione (lactide formed from 2-hydroxyacetic acid, also called "glycolide"), 3,6-dimethyl-1,4-dioxane-2,5-dione (lactide formed from lactic acid, also called "lactide") and 3,6-diphenyl-1,4-dioxane-2,5-dione (lactide formed from mandelic acid).

Preferred hydroxysilanes which are obtained in this way are N-(3-triethoxysilylpropyl)-2-hydroxypropanamide, N-(3-trimethoxysilylpropyl)-2-hydroxypropanamide, N-(3-triethoxysilylpropyl)-4-hydroxypentanamide, N-(3-triethoxysilylpropyl)-4-hydroxyoctanamide, N-(3-triethoxysilylpropyl)-5-hydroxydecanamide and N-(3-triethoxysilylpropyl)-2-hydroxypropyl carbamate.

In addition, suitable hydroxysilanes are also obtainable from the addition of aminosilanes onto epoxides or from the addition of amines onto epoxysilanes. Preferred hydroxysilanes which are obtained in this way are 2-morpholino-4 (5)-(2-trimethoxysilylethyl)cyclohexan-1-ol, 2-morpholino-4(5)-(2-triethoxysilyl-ethyl)cyclohexan-1-ol or 1-morpholino-3-(3-(triethoxysilyl)propoxy)propan-2-ol.

Further suitable polyethers containing silane groups are commercially available products, especially the following: MS Polymer™ (from Kaneka Corp.; especially the 5203H, 5303H, S227, S810, MA903 and S943 products); MS Polymer™ or Silyl™ (from Kaneka Corp.; especially the SAT010, SAT030, SAT200, SAX350, SAX400, SAX725, MAX602, MAX450, MAX951 products); Excestar® (from Asahi Glass Co. Ltd.; especially the S2410, S2420, S3430, S3630 products); SPUR+* (from Momentive Performance Materials; especially the 1010LM, 1015LM, 1050MM products); Vorasil™ (from Dow Chemical Co.; especially the 602 and 604 products); Desmoseal® (from Bayer MaterialScience AG; especially the S XP 2458, S XP 2636, S XP 2749, S XP 2774 and S XP 2821 products), TEGOPAC® (from Evonik Industries AG; especially the Seal 100, Bond 150, Bond 250 products), Polymer ST (from Hanse Chemie AG/Evonik Industries AG, especially the 47, 48, 61, 61LV, 77, 80, 81 products); Geniosil® STP (from Wacker Chemie AG; especially the E10, E15, E30, E35, WP1, and WP2 products).

Particularly preferred organic polymers containing silane groups have end groups of the formula (VII)

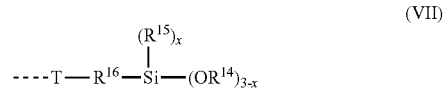

where
$R^{16}$ is a linear or branched divalent hydrocarbyl radical which has 1 to 12 carbon atoms and optionally has cyclic and/or aromatic moieties and optionally one or more heteroatoms, especially one or more nitrogen atoms;

T is a divalent radical selected from —O—, —S—, —N($R^{17}$)—, —O—CO—N($R^{17}$)—, —N($R^{17}$)—CO—O— and —N($R^{17}$)—CO—N($R^{17}$)—, where $R^{17}$ is a hydrogen radical or a linear or branched hydrocarbyl radical which has 1 to 20 carbon atoms and optionally has cyclic moieties, and which optionally has an alkoxysilane, ether or carboxylic ester group; and $R^{14}$, $R^{15}$ and x have the definitions already given.

Preferably, $R^{16}$ is 1,3-propylene or 1,4-butylene, where butylene may be substituted by one or two methyl groups. More preferably, $R^{16}$ is 1,3-propylene.

The composition furthermore comprises between 15 and 35 wt.-%, based on the total composition, of at least one polymeric plasticizer PL. Preferably, the polymeric plasticizer PL is comprised with an amount of between 20 and 30 wt.-%, based on the total composition.

The term "polymeric plasticizer" herein means a polymeric additive that is liquid at room temperature and contains no hydrolyzable silane groups. In contrast to traditional plasticizers, such as phthalates, the polymeric plasticizers generally have a higher molecular weight.

Preferably, the polymeric plasticizer PL has an average molecular weight $M_n$ of 500 to 12,000 g/mol, in particular 1,000 to 10,000 g/mol, more preferably 2,500 to 5,000 g/mol.

Suitable polymeric plasticizers PL include polyols, such as those suitable for the production of the organic polymers P mentioned there, as long as they are liquid at room temperature. Preferred polyols suitable as polymeric plasticizers PL include polyether polyols, polyester polyols, polyhydrocarbon polyols, polybutadiene polyols, and poly(meth)acrylate polyols. Particularly preferred are polyether polyols, especially those with an average molecular weight of $M_n$ of 500 to 12,000 g/mol, especially 1,000 to 10,000 g/mol, more preferably 2,500 to 5,000 g/mol. Such polyols are especially suitable in combination with organic polymers P. Major advantages of using polyether polyols as polymeric plasticizers PL are an especially fast adhesion build-up and especially good adhesion properties.

In especially preferred embodiments of the method according to the present invention, said polymeric plasticizer PL is a polyether, having end groups independently selected from hydrocarbon, alkoxy, hydroxyl, or amino groups. Most preferred is a polyether polyol, i.e. having hydroxyl end groups.

In the same or other especially preferred embodiments of the method according to the present invention, said moisture-curable adhesive composition A does not contain any further plasticizers other than the polymeric plasticizer PL. In particular, the composition most preferably does not comprise any phthalates as plasticizers. Such compositions without any further plasticizers are toxicologically and environmentally advantageous and have fewer problems with migration effects.

The composition A may further comprise catalysts, especially for the crosslinking of silane groups. Suitable further catalysts are especially metal compounds and/or basic nitrogen or phosphorus compounds.

Suitable metal compounds are especially compounds of tin, titanium, zirconium, aluminum or zinc, especially diorganotin(IV) compounds such as, in particular, dibutyltin(IV) diacetate, dibutyltin(IV) dilaurate, dibutyltin(IV) dineodecanoate or dibutyltin(IV) bis(acetylacetonate) and dioctyltin (IV) dilaurate, and also titanium(IV) or zirconium(IV) or aluminum(III) or zinc(II) complexes, especially with alkoxy, carboxylate, 1,3-diketonate, 1,3-ketoesterate or 1,3-ketoamidate ligands.

Suitable basic nitrogen or phosphorus compounds are especially imidazoles, pyridines, phosphazene bases or preferably amines, hexahydrotriazines, biguanides, guanidines or further amidines.

In addition, the composition A may comprise, as cocatalyst, an acid, especially a carboxylic acid. Preference is given to aliphatic carboxylic acids such as formic acid, lauric acid, stearic acid, isostearic acid, oleic acid, 2-ethyl-2,5-dimethylcaproic acid, 2-ethylhexanoic acid, neodecanoic acid, fatty acid mixtures from the hydrolysis of natural fats and oils or di- and polycarboxylic acids, especially poly(meth)acrylic acids.

In a preferred embodiment, the composition A is essentially free of organotin compounds. Organotin-free compositions are advantageous in terms of protection of health and protection of the environment. More particularly, the tin content of the curable composition is in some preferred embodiments less than 0.1% by weight, especially less than 0.05% by weight. These embodiments are especially beneficial to consumers due to low levels of potentially harmful organotin compounds.

In one embodiment, the composition A additionally comprises, as well as the catalyst described, at least one organotitanate. A combination of the catalyst described and an organotitanate has particularly high catalytic activity. This enables rapid curing of such a composition with a comparatively small use amount of organotitanate.

Suitable organotitanates are especially titanium(IV) complexes.

The composition may comprise further constituents, especially the following auxiliaries and additives:

adhesion promoters and/or crosslinkers, especially further aminosilanes, mercaptosilanes, epoxysilanes, (meth)acryloylsilanes, anhydridosilanes, carbamatosilanes, alkylsilanes or iminosilanes, oligomeric forms of these silanes, adducts formed from primary aminosilanes with epoxysilanes or (meth)acryloylsilanes or anhydridosilanes, amino-functional alkylsilsesquioxanes, 3-glycidoxypropyltrimethoxysilane, 3-glycidoxypropyltriethoxysilane or 3-ureidopropyltrimethoxysilane, or oligomeric forms of these silanes;

desiccants or drying agents, especially tetraethoxysilane, vinyltrimethoxysilane, vinyltriethoxysilane or organoalkoxysilanes having a functional group in the α position to the silane group, especially N-(methyldimethoxysilylmethyl)-O-methylcarbamate, (methacryloyloxymethyl)silanes, methoxymethylsilanes, orthoformic esters, calcium oxide or molecular sieves, especially vinyltrimethoxysilane or vinyltriethoxysilane;

additional plasticizers, especially reactive plasticizers, in the form of monofunctional polysiloxanes or monofunctional organic polymers, i.e. those that are silane-reactive at one end, carboxylic esters such as phthalates, especially dioctyl phthalate, bis(2-ethylhexyl) phthalate, bis(3-propylheptyl) phthalate, diisononyl phthalate or diisodecyl phthalate, diesters of ortho-cyclohexane-dicarboxylic acid, especially diisononyl 1,2-cyclohexanedicarboxylate, adipates, especially dioctyl adipate, bis(2-ethylhexyl) adipate, azelates, especially bis(2-ethylhexyl) azelate, sebacates, especially bis(2-ethylhexyl) sebacate or diisononyl sebacate, glycol ethers, glycol esters, organic phosphoric or sulfonic esters, sulfonamides, polybutenes, or fatty acid methyl or ethyl esters derived from natural fats or oils, also called "biodiesel";

solvents;

inorganic or organic fillers, especially natural, ground or precipitated calcium carbonates, optionally coated with fatty acids, especially stearic acid, baryte (heavy spar), talcs, quartz flours, quartz sand, dolomites, wollastonites, kaolins, calcined kaolins, mica (potassium aluminum silicate), molecular sieves, aluminum oxides, aluminum hydroxides, magnesium hydroxide, silicas including finely divided silicas from pyrolysis processes, industrially produced carbon blacks, graphite, metal powders such as aluminum, copper, iron, silver or steel, PVC powder or hollow spheres;

fibers, especially glass fibers, carbon fibers, metal fibers, ceramic fibers or polymer fibers such as polyamide fibers or polyethylene fibers;

dyes;

pigments, especially titanium dioxide or iron oxides;

rheology modifiers, in particular thickeners or thixotropy additives, especially sheet silicates such as bentonites, derivatives of castor oil, hydrogenated castor oil, polyamides, polyurethanes, urea compounds, fumed silicas, cellulose ethers or hydrophobically modified polyoxyethylenes;

stabilizers against oxidation, heat, light or UV radiation;

natural resins, fats or oils such as rosin, shellac, linseed oil, castor oil or soya oil;

non-reactive polymers that are preferably solid at room temperature such as, in particular, homo- or copolymers of unsaturated monomers, especially from the group comprising ethylene, propylene, butylene, isobutylene, isoprene, vinyl acetate or alkyl (meth) acrylates, especially polyethylenes (PE), polypropylenes (PP), polyisobutylenes, ethylene-vinyl acetate copolymers (EVA) or atactic poly-α-olefins (APAO);

flame-retardant substances, especially the already mentioned fillers aluminum hydroxide and magnesium hydroxide, or, in particular, organic phosphoric esters such as, in particular, triethyl phosphate, tricresyl phosphate, triphenyl phosphate, diphenyl cresyl phosphate, isodecyl diphenyl phosphate, tris(1,3-dichloro-2-propyl) phosphate, tris(2-chloroethyl) phosphate, tris(2-ethylhexyl) phosphate, tris(chloroisopropyl) phosphate, tris(chloropropyl) phosphate, isopropylated triphenyl phosphate, mono-, bis- or tris(isopropylphenyl) phosphates of different degrees of isopropylation, resorcinol bis(diphenyl phosphate), bisphenol A bis (diphenyl phosphate) or ammonium polyphosphates;

surface-active substances, especially wetting agents, leveling agents, deaerating agents or defoamers;

biocides, especially algicides, fungicides or substances that inhibit fungal growth;

and other substances customarily used in curable compositions. It may be advisable to chemically or physically dry certain constituents before mixing them into the composition.

The composition A preferably comprises between 0.5 and 2.5 wt.-%, preferably between 1 and 2 wt.-%, based on the total composition, of at least one desiccant or drying agent, most preferably vinyl trimethoxysilane. This range has the advantage that an optimal storage stability and skin formation time can be achieved without rendering the product too stiff and/or brittle after curing.

In a preferred embodiment, the composition A comprises at least one desiccant and at least one adhesion promoter and/or crosslinker.

The composition A may take the form of a one-component or of a multi-component, especially two-component, composition.

In the present document, "one-component" refers to a composition in which all constituents of the composition are stored in a mixture in the same container and which is curable with moisture, in particular moisture from air.

In the present document, "two-component" refers to a composition in which the constituents of the composition are present in two different components that are stored in separate containers. Only shortly before or during the application of the composition are the two components mixed with one another, whereupon the mixed composition cures, optionally under the action of moisture.

Thus, in one or more embodiments of the present invention, composition A is a one-component composition.

In other embodiments, moisture-curable adhesive composition A is a two-component composition consisting of two components A1 and A2, wherein the first component A1 comprises said polymer P and the second component A2 comprises water.

If the composition comprises an organic polymer containing silane groups, the composition is preferably a one-component composition.

Any second or optionally further components is/are mixed with the first component prior to or on application, especially by means of a static mixer or by means of a dynamic mixer.

The moisture-curable adhesive composition A is especially applied at ambient temperature, preferably within a temperature range between 0° C. and 45° C., especially 5° C. to 35° C., and cures under these conditions.

On application, the crosslinking reaction of the silane groups commences, if appropriate under the influence of moisture. Silane groups present can condense with silanol groups present to give siloxane groups (Si—O—Si groups). Silane groups present can also be hydrolyzed on contact with moisture to give silanol groups (Si—OH groups) and form siloxane groups (Si—O—Si groups) through subsequent condensation reactions. As a result of these reactions, the composition ultimately cures. The amidine of the formula (I) or a reaction product thereof accelerates this curing.

If water is required for the curing, this can either come from the air (air humidity), or else the composition can be contacted with a water-containing component, for example by painting, for example with a smoothing agent, or by spraying, or water or a water-containing component can be added to the composition on application, for example in the form of a water-containing or water-releasing liquid or paste, as defined above as component A2. A paste is especially suitable if the composition itself is in the form of a paste.

In the case of curing by means of air humidity, the composition cures from the outside inward, at first forming a skin on the surface of the composition. What is called the "skin time" or "skin formation time" is a measure of the curing rate of the composition. The speed of curing is generally determined by various factors, for example the availability of water, temperature, etc.

A moisture-curable adhesive composition A of this kind typically comprises plasticizers, fillers, adhesion promoters and/or crosslinkers and desiccants, and optionally further auxiliaries and additives.

For the intended application as adhesive in the inventive method, the moisture-curable adhesive composition A preferably has a pasty consistency with structurally viscous properties. Such a pasty adhesive A is especially applied to a substrate S from standard cartridges that are operated manually, by means of compressed air or with a battery, or from a vat or hobbock by means of a delivery pump or an extruder, optionally by means of an application robot.

Moisture-curable adhesive composition A may also have liquid consistency at room temperature with self-leveling properties. It may be slightly thixotropic, such that the coating is applicable to sloping to vertical surfaces without flowing away immediately. In this form, moisture-curable adhesive composition A is preferably applied by means of a roller or brush or by pouring-out and distribution by means, for example, of a roller, a scraper or a notched trowel.

Another aspect of the present invention is the use of a moisture-curable adhesive composition A comprising:
- at least one polymer P containing silane groups,
- between 10 and 40 wt.-%, based on the total composition, of at least one polymeric plasticizer PL,
- between 0.1 and 5 wt.-%, based on the total composition, of at least one monomeric or oligomeric amino-functional alkoxysilane AS1,
- between 0.1 and 5 wt.-%, based on the total composition, of at least one monomeric or oligomeric C3-C20-alkyl-functional alkoxysilane AS2;
- for adhesively bonding two substrates S, wherein at least one of the substrates S is a substrate S1, said substrate S1 comprising at least 40 wt.-%, based on the total weight of substrate S1, of a mixture E, said mixture E consisting of:
  - between 15 and 99 wt.-% of at least one thermoplastic polymer E1,
  - between 1 and 85 wt.-% of at least one elastomer E2;
  said proportions being based on the total weight of mixture E.

All preferred embodiments, restrictions and advantages apply in the same manner for the use described above as they apply for the method according to the present invention and detailed in the description.

Another aspect of the present invention is a Kit-of-parts, comprising:
i) a moisture-curable adhesive composition A comprising:
   - at least one polymer P containing silane groups,
   - between 10 and 40 wt.-%, based on the total composition, of at least one polymeric plasticizer PL,
   - between 0.1 and 5 wt.-%, based on the total composition, of at least one monomeric or oligomeric amino-functional alkoxysilane AS1,
   - between 0.1 and 5 wt.-%, based on the total composition, of at least one monomeric or oligomeric C3-C20-alkyl-functional alkoxysilane AS2; and
ii) at least two substrates S, wherein at least one of the substrates S is a substrate S1, said substrate S1 comprising at least 40 wt.-%, based on the total weight of substrate S1, of a mixture E, said mixture E consisting of:
   - between 15 and 99 wt.-% of at least one thermoplastic polymer E1,
   - between 1 and 85 wt.-% of at least one elastomer E2;
   said proportions being based on the total weight of mixture E.

All preferred embodiments, restrictions and advantages apply in the same manner for the Kit-of-parts described above as they apply for the method according to the present invention and detailed in the description.

Another aspect of the present invention is adhesively bonded substrates S, obtained by the method according to the present invention.

All preferred embodiments, restrictions and advantages apply in the same manner for the adhesively bonded substrates S described above as they apply for the method according to the present invention and detailed in the description.

EXAMPLES

Adduced hereinafter are working examples which are intended to elucidate the invention described in detail. It will be appreciated that the invention is not restricted to these described working examples. "Standard climatic conditions" refer to a temperature of 23±1° C. and a relative air humidity of 50±5%.

Preparation of Example Substrates S1

A series of example substrates S1 were prepared. The materials shown in Table 1 were used in these examples.

The example sheets were produced using a laboratory scale extrusion-calendering apparatus consisting of a twin screw extruder (Berstorff GmbH), a flat die and set of water-cooled calender rolls. Extrusion temperatures and pressures are presented in Table 2.

TABLE 1

Materials used for preparing the sample substrates S1.

| Material | Type/description | Provider |
|---|---|---|
| Hifax CA 10 | Reactor TPO | LyondellBasell |
| Vistamaxx 6202 | Propylene ethylene copolymer | Exxon Mobil |
| BB2030 | Bromobutyl rubber | Lanxess |
| SiloxActif E80 | Zinc oxide catalyst | Safic Alcan |
| Stearic acid | Stearic acid | Emery Oleochemicals |
| Thermal stabilizer | Thermal stabilizer | Ciba Specialty Chemicals |
| NOR-HALS 1 | Alkoxyamine hindered amine light stabilizer | Ciba Specialty Chemicals |
| NOR-HALS 2 | Alkoxyamine hindered amine light stabilizer | Ciba Specialty Chemicals |
| Alumina trihydrate | $Al(OH)_3$ | Albemarle |
| Titanium dioxide | $TiO_2$ | Kronos |

TABLE 2

Composition and production details for sample substrates S1.

| Comp. Substrate S1 [phr] | Component | S1-a | S1-b | S1-c | S1-d |
|---|---|---|---|---|---|
| Hifax CA 10 | T. polymer E1 | 29 | 23 | 20 | 26 |
| Vistamaxx 6202 | T. polymer E1 | 71 | 56 | 49 | 63 |
| BB2030 | Elastomer E2 | 0 | 21 | 31 | 11 |
| SiloxActif E80 | Catalyst | 1.38 | 1.38 | 1.38 | 1.38 |
| Stearic acid | Co-catalyst | 0.35 | 0.35 | 0.35 | 0.35 |
| Thermal stabilizer | Stabilizer | 0.1 | 0.1 | 0.1 | 0.1 |
| NOR-HALS 1 | Stabilizer | 0.45 | 0.45 | 0.45 | 0.45 |
| NOR-HALS 2 | Stabilizer | 0.3 | 0.3 | 0.3 | 0.3 |
| Alumina trihydrate | Flame retarder | 42 | 42 | 42 | 42 |
| Titanium dioxide | UV stabilizer | 3 | 3 | 3 | 3 |
| Extruder conditions | | | | | |
| Extrusion temp. [° C.] | | 185 | 185 | 185 | 185 |
| Head pressure [bar] | | 70 | 70 | 70 | 70 |

In producing of the example sheets, the thermoplastic elastomer and the non-crosslinked elastomer were fed to the extruder hopper. The blend was melt-processed in the first of the four zones of the extruder and an additive package containing a mixture of a catalyst, hindered amine light stabilizers (NOR-HALS), and flame retardants was added to the partially melt-processed blend at beginning of the second zone of the extruder. The melt-processed blend was then extruded through the flat die into single ply sheets having a thickness of approximately 0.8 mm.

Test specimens were cut from the example sheets to test the mechanical properties of the compositions. The ingredients of the blends of the example sheets are shown in Tables 2.

Additionally, a commercial PVC-based substrate (reference) was used as substrate S1. The reference PVC sample ("PVC-a") is commercially available under the trade name Sarnafil® G 410-15 EL and consists of a multilayer waterproofing sheet of 1.5 mm thickness based on polyvinyl chloride.

Preparation of Example Moisture-Curable Adhesive Composition A

An example substrates moisture-curable adhesive composition A was prepared (Table 4). The materials shown in Table 3 were used in this example.

TABLE 3

Materials used for preparing the sample adhesive A.

| Material | Type/description | Provider |
| --- | --- | --- |
| Polymer STP-1 | Polymer P (based on polyether-polyurethane) | preparation detailed below |
| Plasticizer PL-a | Plasticizer PL (Acclaim ® Polyol 4200); Mn approx. 4000 g/mol | Covestro |
| A1110 | Silane AS1 (3-Aminopropyl trimethoxysilane) | Momentive |
| OCTMO | Silane AS2 (Octyltrimethoxysilane) | Evonik |
| VTMO | Drying agent (Vinyltrimethoxysilane) | Evonik |
| Thixotropy additive | Modified castor oil (Thixatrol ® ST) | Elementis |
| PCC (Filler) | Surface-treated, precipitated CaCO$_3$ (Socal ® U1S2) | Solvay |
| GCC (Filler) | Natural, ground chalk (Omyacarb ® 5-GU) | Omya |
| Catalyst | Dibutyltin dilaurate (Fascat® 4202) | PMC Organometallix |

TABLE 4

Composition details for example adhesive A. All amounts in weight percent based on the total adhesive compostion.

| Comp. Adhesive A [wt.-%] | Component | A-a |
| --- | --- | --- |
| Polymer STP-1 | Polymer P (based on polyether-polyurethane) | 15.9 |
| Plasticizer PL-a | Plasticizer PL (Acclaim ® Polyol 4200); Mn approx. 4000 g/mol | 22 |
| A1110 | Silane AS1 (3-Aminopropyl trimethoxysilane) | 1 |
| OCTMO | Silane AS2 Octyltrimethoxysilane | 3 |
| VTMO | Drying agent (Vinyltrimethoxysilane) | 2 |
| Thixotropy additive | Modified castor oil (Thixatrol ® ST) | 4 |
| PCC (Filler) | Surface-treated, precipitated CaCO$_3$ (Socal ® U1S2) | 15 |
| GCC (Filler) | Natural, ground chalk (Omyacarb ® 5-GU) | 37 |
| Catalyst | Dibutyltin dilaurate (Fascat ® 4202) | 0.1 |

Preparation of a Silane-Functional Polymer P (Polymer STP-1)

With exclusion of moisture, 1000 g of Acclaim® 12200 polyol (polyoxy-propylenediol having a low level of unsaturation, from Covestro; OH number 11.0 mg KOH/g), 43.6 g of isophorone diisocyanate (IPDI; Vestanat® IPDI, from Evonik), 126.4 g of diisodecyl phthalate (DIDP) and 0.12 g dibutyl tin dilaurate (DBTDL) were heated up to 90° C. while stirring constantly and left at this temperature until the content of free isocyanate groups determined by titrimetry had reached a stable value of 0.63% by weight. Subsequently, 63.0 g of diethyl N-(3-trimethoxysilylpropyl)-aminosuccinate (adduct formed from 3-aminopropyltrimethoxysilane and diethyl maleate; prepared according to the details in U.S. Pat. No. 5,364,955) were mixed in and the mixture was stirred at 90° C. until it was no longer possible to detect any free isocyanate by means of FT-IR spectroscopy. The polyether containing trimethoxysilane groups thus obtained, having a silane equivalent weight of about 6880 g/eq (calculated from the amounts used), was cooled down to room temperature and stored with exclusion of moisture.

For preparing the example adhesive composition A as detailed in Table 4, the polymers P, the plasticizer, drying agent, and the thixotropy additive were thoroughly mixed for 5 minutes. Subsequently, the dried fillers were added with kneading during 15 minutes at 60° C. With the heater switched off, silanes AS1 and AS2 and catalyst were added and the compositions were subsequently processed to a homogeneous paste during 10 minutes under vacuum. Said paste was subsequently filled into internally coated aluminum spreading piston cartridges, which were closed air-tight and stored under standard climate conditions for at least 24 h until the testing protocol was employed.

Additionally, a commercial polyurethane-based adhesive (reference) was used as moisture-curable adhesive A. The reference PU adhesive ("PU-a") is commercially available under the trade name Sarnacol® 2142 S (by Sika) and consists of a one-component moisture-curable polyurethane adhesive especially designed to bond large area membranes.

Comparison of Adhesion Performance of Substrates S and Adhesives A

A series of experiments (Z1a-Z6a) were performed to evaluate the adhesion performance of different substrate-adhesive pairs. The results are shown in Table 5. All procedures including sample preparation, storage and testing were done under standard climate conditions.

All samples were prepared by applying the adhesive A onto substrate S2 using a tooth spatula (400 g adhesive/m$^2$ substrate). The substrates were cleaned by isopropanol directly prior to application of the adhesive. Two different substrates S2 were used in individual experiments: 3-layer plywood ("plywood") and roofing tile fibre cement ("cement"). After application of the adhesive, the substrate S1 (backside) was immediately applied into the still wet adhesive (wet lay in procedure). The membrane sheet of substrate S1 was then rolled down 6 times using a 5 kg roller. Conditioning of the sample under standard climate conditions consisted of 2 days under roller weight (5 kg), followed by 5 days without weight. After 7 days, the "initial" sample was measured. The other samples were stored under normal climate for the time detailed in Table 5 (4 to 12 weeks).

After each defined storage time, the peel strength was determined by pulling the substrate S1 perpendicularly from the substrate S2. The peel strength was determined in N/50 mm.

TABLE 5

Comparison of adhesive performance of different substrate-adhesive combinations.

| Experiment | Z1a (Ref.) | Z2a (Ref.) | Z3a | Z4a | Z5a (Ref.) | Z6a (Ref.) |
| --- | --- | --- | --- | --- | --- | --- |
| Substrate S1 | S1-c | S1-c | S1-c | S1-c | PVC-a | PVC-a |
| Substrate S2 | plywood | cement | plywood | cement | plywood | cement |
| Adhesive A | PU-a | PU-a | A-a | A-a | A-a | A-a |
| Peel strength Initial [N/50 mm] | 11 | 16 | 20 | 19 | 76 | 91 |
| Peel strength 4 weeks [N/50 mm] | 12 | 13 | 64 | 31 | 96 | 79 |
| Peel strength 8 weeks [N/50 mm] | 12 | 14 | 55 | 70 | 90 | 96 |
| Peel strength 12 weeks [N/50 mm] | 12 | 12 | 99 | 120 | 94 | 111 |

TABLE 5-continued

Comparison of adhesive performance of different substrate-adhesive combinations.

| Experiment | Z1a (Ref.) | Z2a (Ref.) | Z3a | Z4a | Z5a (Ref.) | Z6a (Ref.) |
|---|---|---|---|---|---|---|
| Fracture % (c/a/s) initial | 0/100/0 | 0/100/0 | 5/95/0 | 5/95/0 | 40/0/60 | 100/0/0 |
| Fracture % (c/a/s) 4 weeks | 0/100/0 | 0/100/0 | 40/60/0 | 40/40/20 | 90/0/10 | 100/0/0 |
| Fracture % (c/a/s) 8 weeks | 0/100/0 | 0/100/0 | 35/65/0 | 40/55/5 | 50/10/40 | 100/0/0 |
| Fracture % (c/a/s) 12 weeks | 0/100/0 | 0/100/0 | 75/25/0 | 30/40/30 | 50/10/40 | 100/0/0 |

For the fracture assessment, the resulting fracture in each measurement was assessed in percentage cohesive/adhesive/substrate failure (da/s). Cohesive failure means break of the adhesive, adhesive failure means detachment of the adhesive from substrate S1 without traces, and substrate failure means break of substrate S2 (adhesive stronger than substrate S2).

Comparison of Weight Change of Substrates S in Contact with Adhesives A

A series of experiments (Z1b-Z6b) were performed to evaluate the weight change due to plasticizer migration of different substrates in contact with adhesives. The results are shown in Table 6. For this test, 10 g adhesive were contacted between 18 g of membranes and pressed down using a 10 kg roller. The samples were conditioned during the times and the temperatures indicated in Table 6. Weight (mass) of the sample membranes were measured using a precision balance. The values in Table 6 are mass changes in % relative to the original mass of the substrate sample. A mass increase indicates migration of a plasticizer into the substrate S1, while a mass decrease indicates migration of plasticizer out of the measured substrate.

TABLE 6

Comparison of weight change of substrates S1 in contact with adhesives A.

| Experiment | Z1b (Ref.) | Z2b (Ref.) | Z3b | Z4b | Z5b (Ref.) | Z6b (Ref.) |
|---|---|---|---|---|---|---|
| Substrate S1 | S1-c | S1-c | S1-c | S1-c | PVC-a | PVC-a |
| Adhesive A | PU-a | PU-a | A-a | A-a | A-a | A-a |
| Ageing [ C] | 50 | 70 | 50 | 70 | 50 | 70 |
| Mass change 1 week [%] | +0.4 | +1.2 | 0 | +0.2 | −3.0 | −6.1 |
| Mass change 2 weeks [%] | +0.4 | +1.8 | +0.1 | +0.3 | −4.4 | −8.7 |
| Mass change 4 weeks [%] | +0.7 | +2.5 | +0.1 | +0.4 | −6.6 | −10.7 |
| Mass change 6 weeks [%] | +0.8 | +3.0 | +0.2 | +0.4 | −7.8 | −11.6 |
| Mass change 8 weeks [%] | +1.0 | +3.3 | +0.2 | +0.4 | −8.7 | −12.3 |
| Mass change 10 weeks [%] | +1.1 | +3.6 | +0.2 | +0.4 | −9.8 | −12.6 |

Comparison of adhesion performance of substrates S1 and adhesives A

A series of experiments (Z1c-Z4c) were performed to evaluate the adhesion performance of different substrate-adhesive pairs. The results are shown in Table 7. All procedures including sample preparation, storage and testing were done under standard climate conditions. The sample and measurement procedures were identical to the ones described for experiments Z1a-Z6a, with the exception that 800 g/m² of adhesive were used.

TABLE 7

Comparison of adhesive performance of different substrate-adhesive combinations. "n/m" means that the value was not measured.

| Experiment | Z1c (Ref.) | Z2c | Z3c | Z4c |
|---|---|---|---|---|
| Substrate S1 | S1-a | S1-b | S1-c | S1-d |
| Substrate S2 | plywood | plywood | plywood | plywood |
| Adhesive A | A-a | A-a | A-a | A-a |
| Peel strength Initial 7 days [N/50mm] | 10 | 77 | 65 | 104 |
| Peel strength 14 days [N/50mm] | 7 | 103 | 64 | 147 |
| Peel strength 24 days [N/50mm] | 7 | 81 | 103 | 144 |
| Peel strength 56 days [N/50mm] | 10 | 84 | 159 | n/m |
| Fracture % (c/a/s) initial 7 days | 0/100/0 | 20/70/10 | 5/60/35 | 20/40/40 |
| Fracture % (c/a/s) 14 days | 0/100/0 | 45/5/50 | 30/20/50 | 40/40/20 |
| Fracture % (c/a/s) 24 days | 0/100/0 | 30/0/70 | 20/20/60 | 40/30/30 |
| Fracture % (c/a/s) 56 days | 0/100/0 | 30/0/70 | 30/0/70 | n/m |

The invention claimed is:

1. A method for adhesively bonding two substrates S, comprising the steps:
    a) applying a moisture-curable adhesive composition A onto at least one of the two substrates S;
    b) joining the two substrates S together such that the applied moisture-curable adhesive composition A forms an interlayer between the two substrates S such that the substrates S are directly connected by the interlayer; and
    c) curing the moisture-curable adhesive composition A by means of moisture; wherein
    at least one of the substrates S is a substrate S1, the substrate S1 comprising:
        at least 40 wt.-%, based on the total weight of substrate S1, of a mixture E, said mixture E consisting of:
            between 15 and 99 wt.-% of at least one thermoplastic polymer E1,
            between 1 and 85 wt.-% of at least one elastomer E2, the proportions being based on the total weight of mixture E;
    and wherein
    the moisture-curable adhesive composition A comprises:
        at least one polymer P containing silane groups,
        between 10 and 40 wt.-%, based on the total composition, of at least one polymeric plasticizer PL,
        between 0.1 and 5 wt.-%, based on the total composition, of at least one monomeric or oligomeric amino-functional alkoxysilane AS1,
        between 0.1 and 5 wt.-%, based on the total composition, of at least one monomeric or oligomeric C3-C20-alkyl-functional alkoxysilane AS2.

2. The method according to claim 1, wherein the at least one elastomer E2 is selected from the group consisting of butyl rubber and halogenated butyl rubber and/or the at least one thermoplastic polymer E1 is at least one thermoplastic polyolefin elastomer (TPE-O).

3. The method according to claim 1, wherein the thermoplastic polymer E1 and the elastomer E2 elastomer form a co-continuous phase.

4. The method according to claim 1, wherein the substrate S1 is a membrane or sheet having a thickness of at least 0.1 mm.

5. The method according to claim 1, wherein the substrate S1 is not pre-treated by a chemically reactive primer, flame, oxofluorination, plasma, or corona pre-treatment prior to step a).

6. The method according to claim 1, wherein the polymer P containing silane groups is an organic polymer containing silane groups.

7. The method according to claim 1, wherein the polymeric plasticizer PL is a polyether, having end groups independently selected from hydrocarbon, alkoxy, hydroxyl, or amino groups.

8. The method according to claim 1, wherein the moisture-curable adhesive composition A does not contain any further plasticizers other than the polymeric plasticizer PL.

9. The method according to claim 1, wherein the moisture-curable adhesive composition A comprises the polymer P with an amount of between 10 and 30 wt.-%, based on the total composition A.

10. The method according to claim 1, wherein the moisture-curable adhesive composition A comprises the C3-C20-alkyl-functional alkoxysilane AS2 with an amount of at least 0.5 wt.-%, based on the total composition A and/or the C3-C20-alkyl-functional alkoxysilane AS2 is a monomeric or oligomeric C6-C8-alkyl-functional alkoxysilane.

11. The method according to claim 1, wherein the moisture-curable adhesive composition A is a two-component composition consisting of two components A1 and A2, wherein the first component A1 comprises the polymer P and the second component A2 comprises water.

12. The method according to claim 1, wherein the second one of the substrates S is a substrate S2, the substrate S2 being selected from the list consisting of: glass, glass ceramic, concrete, mortar, brick, tile, gypsum, natural stone, metals and alloys, textiles, wood, wood-resin composites, resin-textile composites, resin-glass- or carbon-fiber composites, polyvinyl chloride (PVC), acrylonitrile-butadiene-styrene copolymers (ABS), polycarbonate (PC), polyamide (PA), polyesters, poly(methyl methacrylate) (PMMA), epoxy resins, paints, varnishes, coated substrates, and bitumen.

13. Use of Two substrates S adhesively bonded by curing a moisture-curable adhesive composition A comprising:
at least one polymer P containing silane groups,
between 10 and 40 wt.-%, based on the total composition, of at least one polymeric plasticizer PL,
between 0.1 and 5 wt.-%, based on the total composition, of at least one monomeric or oligomeric amino-functional alkoxysilane AS1,
between 0.1 and 5 wt.-%, based on the total composition, of at least one monomeric or oligomeric C3-C20-alkyl-functional alkoxysilane AS2,
wherein at least one of the substrates S is a substrate S1, the substrate S1 comprising:
at least 40 wt.-%, based on the total weight of substrate S1, of a mixture E, said mixture E consisting of:
between 15 and 99 wt.-% of at least one thermoplastic polymer E1,
between 1 and 85 wt.-% of at least one elastomer E2, the proportions being based on the total weight of mixture E.

14. A kit-of-parts comprising:
i) a moisture-curable adhesive composition A comprising:
at least one polymer P containing silane groups,
between 10 and 40 wt.-%, based on the total composition, of at least one polymeric plasticizer PL,
between 0.1 and 5 wt.-%, based on the total composition, of at least one monomeric or oligomeric amino-functional alkoxysilane AS1;
between 0.1 and 5 wt.-%, based on the total composition, of at least one monomeric or oligomeric C3-C20-alkyl-functional alkoxysilane AS2; and
ii) at least two substrates S, wherein at least one of the substrates S is a substrate S1, said substrate S1 comprising:
at least 40 wt.-%, based on the total weight of substrate S1, of a mixture E, said mixture E consisting of:
between 15 and 99 wt.-% of at least one thermoplastic polymer E1,
between 1 and 85 wt.-% of at least one elastomer E2;
said proportions being based on the total weight of mixture E.

15. Adhesively bonded substrates S, obtained by the method according to claim 1.

* * * * *